Figure 1:
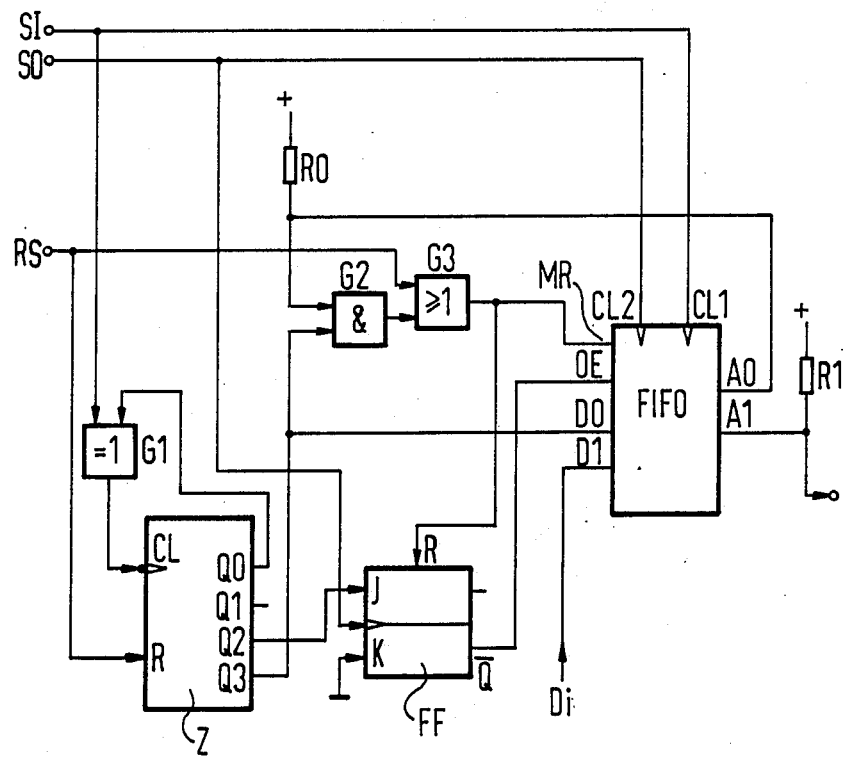

United States Patent [19]

Haberer

[11] Patent Number: 4,881,242

[45] Date of Patent: Nov. 14, 1989

[54] CIRCUIT ARRANGEMENT FOR THE TRANSMISSION OF DATA SIGNALS

[75] Inventor: Herbert Haberer, Munich, Fed. Rep. of Germany

[73] Assignee: Siemens Aktiengesellschaft, Berlin and Munich, Fed. Rep. of Germany

[21] Appl. No.: 91,679

[22] Filed: Aug. 31, 1987

[30] Foreign Application Priority Data

Sep. 9, 1986 [DE] Fed. Rep. of Germany ....... 3630699

[51] Int. Cl.[4] .......................... H04L 7/08; H04J 3/07
[52] U.S. Cl. ..................................... 375/118; 370/102
[58] Field of Search ............... 375/118, 120, 106, 111; 370/100, 102

[56] References Cited

U.S. PATENT DOCUMENTS

| | | | |
|---|---|---|---|
| 4,596,026 | 6/1986 | Cease et al. | 375/118 |
| 4,718,074 | 1/1988 | Mannas et al. | 375/120 |
| 4,791,652 | 12/1988 | McEachern et al. | 375/118 |
| 4,811,340 | 3/1989 | McEachern et al. | 370/102 |

FOREIGN PATENT DOCUMENTS 1904591 10/1972 Fed. Rep. of Germany .
1289051 9/1972 United Kingdom .

Primary Examiner—Robert L. Griffin
Assistant Examiner—Marianne Huseman
Attorney, Agent, or Firm—Adel A. Ahmed

[57] ABSTRACT

A circuit arrangement includes a memory arrangement in which data signal bits forming the data signals can be read in at read-in times determined by a first clock pulse train and from which these data signal bits can be read out at read-out times determined by a second clock pulse train. A monitoring arrangement periodically and repetitively provides a test bit which can be read into or as the case may be out of the memory arrangements in parallel to the data signal bits. At its initialization, this monitoring arrangement enables the reading out of data signal bits previously entered in the memory arrangement with a delay, such that thereafter a predetermined phase relationship exists between test bits read into and read out of the memory arrangement. The monitoring arrangement provides a control signal which disables the memory arrangement lilmited in time with regard to the reading out of data signal bits and test bits when a defined predetermined change in this phase relationship is exceeded. Through such disabling, the defined phase relationship between test bits read in and read out is at least substantially reestablished.

3 Claims, 2 Drawing Sheets

CIRCUIT ARRANGEMENT FOR THE TRANSMISSION OF DATA SIGNALS

The present invention relates to a circuit arrangement for the transmission of data signals including a memory arrangement in which data signal bits forming the data signals may be read in at read in times determined by the occurrence of pulses of a first clock pulse train and in which the data signal bits can be read out at read out points determined by the occurrence of a second clock pulse train, and a monitoring arrangement which provides a control signal on the occurrence of a defined variation of the read-in times for the individual data signal bits from the read-out times respectively allocated thereto for such a change in the read-out or as the case may be the reading times that the desired temporal separation between these times is again established.

A circuit arrangement is known for compensating transmission time changes in the transmission of time multiplex information signals from an information signal transmission point to a transmission signal receiving point (DE-AS1904591). This known circuit arrangement includes at least two intermediate memories which are effectively controlled in cyclical succession for storing the information signals supplied to the information signal receiving point during the duration of the time windows of the time window raster utilized on the transmission path and in cyclical succession for reading out the respective information signals during the duration of the time windows of the time window raster utilized in the information receiving point for the further transmission of information signals. Furthermore the known circuit arrangement includes a monitoring arrangement which on the occurrence of a defined deviation of the point in time of the reading in of the information signals in a defined intermediate memory relative to the point in time of the reading out of information signals from another intermediate memory provides a control signal for such a change of the reading-in point in time relative to the reading-out point in time of information signals that the desired time separation between these points in time is re-established. For their efficient switching, the intermediate memories are coupled on their input and output sides with respective switch arrangements which cyclically receive read-in and read-out signals for reading-in and reading-out of information signals, respectively. In this connection, predetermined write-in and read-out signals are monitored in regard to their separation in time by the aforementioned monitoring arrangements formed as comparator arrangements. In the event of deviations, the monitoring arrangements provide control signals to the clock generator forming the read-out signals which, responsive to such control signals, forms read-out signals with altered phase position. However, such a controllable clock generator requires a high degree of circuit technological expenditure which is generally undesirable for general applications.

A task of the present invention is to provide compensation of variations between read-in and read-out points in time in a circuit arrangement of the aforementioned type.

The above described task is solved in a circuit arrangement of the above mentioned type wherein, in accordance with the invention a test bit of predetermined binary value periodically and repetitively provided by the monitoring arrangement is controlled by way of the aforementioned pulses of both clock pulse trains in parallel with the data signal bits, is readable into the memory arrangement and may be read out of the same with these data signal bits, in that the monitoring arrangement at its initialization enables the reading out of data signal bits and test bits previously read in to the memory arrangement in a delayed manner, such that in connection therewith, a phase relationship exists between the test bits read in to and out of the memory arrangement corresponding to the aforementioned separation in time between the write-in points in time and the corresponding respective read-out points in time for data signal bits into or, as the case may be, out of the memory arrangement and in that the monitoring arrangement, when a predetermined defined change in this phase relationship is exceeded causes, by providing the aforementioned control signal such a time limited disabling of the memory arrangement in relation to the reading out of data signal bits and test bits, that the desired phase relationship between written in and read out test bits is at least approximately again obtained.

An advantage of the invention resides in that monitoring of the write-in and read-out processes is possible by way of the test bits read into the memory arrangement in parallel to the data signal bits, independently of the memory arrangement directly involved in the transmission of data signals. In this manner, for example, memory arrangements can also be included in the transmission of data signals whose write-in and read-out control arrangements are not accessible for monitoring purposes. A further advantage of the invention resides in the type of compensation of changes in the write-in and read-out points in time. Since such changes are compensated by way of the mentioned disabling of the memory arrangement with regards to reading out of data signal bits, clock generators are utilizable for the control of read in and read out processes which provide pulse trains which are not controllable in their phase position. Such clock generators are realizable with substantially less circuitry in comparison with controllable clock generators needed in the prior art.

Figure 2:
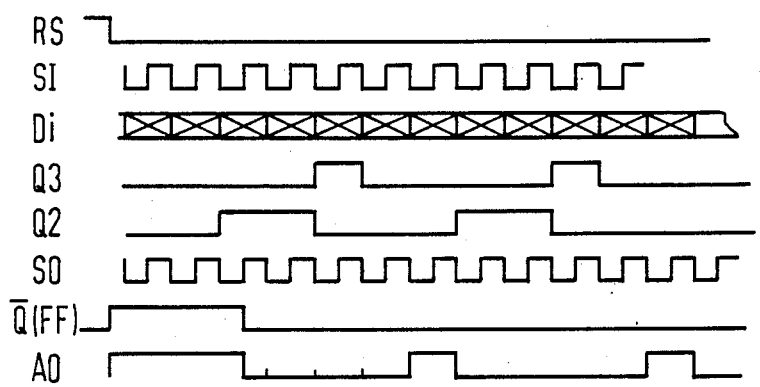

The invention will next be described in greater detail by way of exemplory embodiments with the aid of the drawings in which FIG. 1 shows a circuit arrangement in accordance with the invention; and FIGS. 2-4 respectively show pulse diagrams helpful in understanding a description of the invention.

FIG. 1 shows a circuit arrangement suitable for insertion into a data transmission arrangement which receives data signals having a first clock pulse train rate and transmits them further with the aid of a second clock pulse train. This may be required, for example, when data signal bits forming the data signals appearing on a transmission line corresponding to a fixed transmission clock have to be further transmitted in the respective data transmission arrangement with an internal clock.

The circuit arrangement shown in FIG. 1 includes a memory arrangement FIFO in the form of a transit memory. Such transit memories are also referred to as first-in-first-out memories. This transit memory, which may, for example comprise a memory component offered by the firm RCA under the description CD40105B, includes two clock inputs CL1 and CL2. It receives input clock pulses SI by way of clock input CL1 for reading in of input signals applied thereto and has output clock pulses S0 applied thereto for reading out of input signals previously applied thereto. Two data signal inputs D0 and D1 are available for reading in of input signals. In the Present case, data signal bits and test bits to be further transmitted by way of the transit memory may be input signals. The test bits will next be considered in greater detail. In this connection, the data signal bits appear at the data signal input D1 and the test bits at data signal input D0. The data signal bits and test bits received by way of both data signal inputs are again read out by way of data signal outputs designated A0 and A1. Data signal inputs and outputs designated by the same numeral correspond to one another. That is data signal bits received in the transit memory appear at data signal output A1 and the test bits re-appear at data signal output A0.

Transit memory FIFO includes further two control inputs designated MR and OE. The transit memory can be set in a defined output condition by a corresponding control signal by way of control input MR. On the other hand it may be set in a blocked condition by way of control input OE in relation to the reading out of signals stored therein. The taking up of output clock pulses S0 is interrupted in this disabled condition. In addition, in this disabled condition in the aforementioned memory type (CD40105B) the outputs, are arranged as so-called tristate outputs, are placed in their high impedance condition.

A monitoring arrangement is coupled to the aforementioned memory arrangement FIFO. This monitoring arrangement comprises an enabling arrangement and a comparator arrangement coupled thereto. A counter Z is appurtenant to the enabling arrangement. This counter is a resettable four bit counter. In this arrangement, these four bits are assigned to counter outputs designated Q0 to Q3. In this arrangement, counter ouput Q0 carries the bit of lowest value. The value of the individual bits then increases with increasing number.

Counter Z is on the one hand coupled on its input side by way of a reset input R with a reset line RS. On the other hand, a clock input CL of this counter is coupled to the output of an exclusive-or-unit G1. This exclusive-OR unit has the previously mentioned input clock pulse SI applied to one of its inputs. A further input is coupled with counter output Q0. On the other hand the counter output designated Q2 is coupled with the J input of a JK flip flop FF controlled by the output clock pulse train S0. The K input of this flip flop is permanently set to ground potential. The output Q negating the output signals is coupled to the previously mentioned control input OE of the transit memory FIFO.

The counter output designated Q3 of counter Z is on the one hand coupled to the previously mentioned data signal input D0 and on the other hand is coupled to an input of an AND unit G2 appurtenant to the previously mentioned comparator arrangement. A further input of this AND unit is coupled to output A0 of the transit memory. The output of this AND unit is coupled to an input of an OR unit G3. The previously mentioned reset line RS is coupled to a further input. The output side of this OR unit is on the one hand coupled to the control input MR of the transit memory FIFO and on the other hand is coupled with a reset input R of flip flop FF.

Outputs A0 and A1 of the transit memory FIFO are respectively set to a positive potential by way of a high resistance resistor R0 or R1 as the case may be. By these resistors, goal is achieved that, when the above mentioned memory component is utilized, that in the blocking condition of the transit memory, a defined potential corresponding to a logic 1 level appears at the tristate ouputs A0 and A1. When memory components are used which do not have tristate outputs, the two resistors are not required.

Now that the construction of the circuit arrangement shown in FIG. 1 has been described, the operation of this circuit arrangement will be described in greater detail in conjunction with FIGS. 2–4. In this context, FIG. 2 shows a pulse diagram for the initialization phase of the circuit arrangement shown in FIG. 1. A reset signal appearing on line RS, the data signal bits appearing on the data signal input DI of the transit memory FIFO, and the input and ouput clock pulse trains SI and SO are shown as input signals. In this context, the pulses of this clock pulse train may have equal frequency and phase. Furthermore, the signals appearing at both counter outputs Q2 and Q3, at the output Q of flip flop FF as well as at the output A0 of the transit memory FIFO are shown in FIG. 2.

Figure 3:
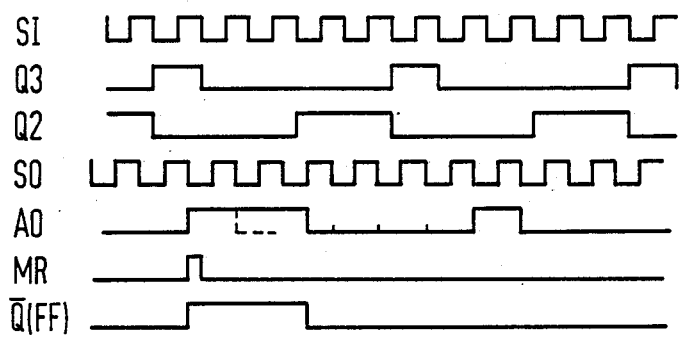
Figure 4:
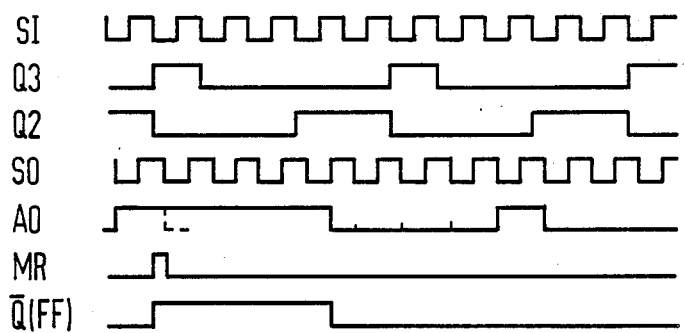

FIGS. 3 and 4 respectively show a pulse diagram for the case in which a phase difference exits between the pulses of the input and output clock pulse trains SI and SO. Respectively shown again are the input and output clock pulse trains SI and SO, the signals appearing at the counter outputs Q2 and Q3, at the output Q of flip flop FF and at the output A0 of the transit memory FIFO. Furthermore a signal is respectively shown in both figures which appears at the control input MR of the transit memory FIFO.

In the following, the initialization phase of the circuit arrangement shown in FIG. 1 will now be more closely considered.

When a reset signal in the form of a logic 1 pulse appears, counter Z, flip flop FF, and the transit memory FIFO are correspondingly placed in their initial condition. In this initial condition, both counter outputs Q2 and Q3 respectively provide a logic 0 level, whereas a logic 1 appears at output Q of flip flop FF. This logic 1 level results in transit memory FIFO being placed in its blocking condition, in which it provides a logic 1 level respectively at its outputs A0 and A1.

On the occurrence of the trailing edge of the reset pulse, counter Z starts in its counting mode, controlled by input clock pulse train SI applied thereto. During this counting mode it provides at its counter output Q2 periodically repeated logic 1 pulses with a mark space ratio of 2:3. The logic 1 levels of these pulses are utilized as enable signals for transit memory FIFO. On the other hand logic 1 pulses with a mark space ratio of 1:4 appear at counter output Q3. The logic 1 level of these pulses corresponds respectively to the duration of a data signal bit to be entered into transit memory FIFO and appear simultaneously with such a data signal bit. These logic 1 levels are utilized as test bits for the transit memory FIFO. A test bit appears thereby with each fifth data signal bit with the given mark space ratio of 1:4. The test bits and the aforementioned enable signals otherwise have the same period. In this context, the leading edge of the test bit coincides with the trailing edge of the enable signals.

After the appearance of the trailing edge of the reset pulse, the data signal bits appearing at the data signal input DI and the test bits applied to the data signal input D0 are entered into the transit memory. In this context entry takes place respectively with the leading edge of a pulse of the input clock pulse train SI. In this context the transit memory remains in its disabled condition for the present, that is it is blocked with regard to reading out of data signal bits and test bits. This blocking brings about the logic 1 level of the flip flop FF which is still in its initial condition. This flip flop is only first placed in its enabled condition on the occurrence of the next enable signal at the counter output Q2 of counter Z at the leading edge of the pulse of the output clock pulse train S0 coinciding with this enable signal. In this enabled condition, the flip flop provides a logic 0 level. This logic 0 level then causes transit memory FIFO to be enabled with regard to reading out of data bits and test bits.

In the present exemplary embodiment, the delayed enabling of transit memory FIFO is so selected that a period of time corresponding to the occurrence of two consecutive data signal bits exists between entering of a defined data signal bit in the transit memory and its being read out from this transit memory. This time Period corresponds also to the phase relationship between the test bit read in and read out in parallel with the data signal bits as may be understood from the pulse trains Q3 and A0 in FIG. 2.

So long as the phase relationship between the input and output clock pulse trains applied to the transit memory varies only within a prescribed limit, flip flop FF remains in its enabled condition. The transit memory thereby also remains enabled for reading in of data signal bits and test bits as well as for the reading out thereof. The limit for a change of phase relationship is selected such that at this limit an overlapping in time of the test bits read in to the transit memory and the test bits read-out therefrom occurs. FIGS. 3 and 4 show two different cases for overlapping in time. In this context, FIG. 3 shows the case where an overlapping in time at the trailing edge of a test bit read into the transit memory occurs because of a time advance of the input clock pulses in relation to the output clock pulses. On the other hand FIG. 4 shows an overlapping in time of test bits compared with one another at the leading edge of a test bit read into the transit memory. This occurs with a time advance of the output clock pulses in relation to the input clock pulses.

Both of the last mentioned cases cause the AND unit G2 belonging to the mentioned comparator arrangement which receives at its input terminals the test bits provided from counter Z and the transit memory FIFO respectively, to supply a control signal corresponding to the overlapping in time of these test bits. This control signal is applied to the control input MR of the transit memory by way of the OR unit G3 as well as to the reset input R of flip flop FF. The control signal appearing at the output of this OR unit is shown in FIGS. 3 and 4 under the designation MR. On the one hand this control signal causes flip flop FF to be placed in its disabled condition (initial condition). On the other hand transit memory FIFO goes again to its initial condition in response to this control signal. Furthermore it is disabled with regard to reading out of data signal bits and test bits, brought about through the disabled condition of flip flop FF. Hereupon, corresponding control processes follow the control processes occurring in the initialization phase described in the foregoing. Now, that is until flip flop FF is again enabled, only data signal bits and test bits are taken into transit memory FIFO. In this context, this enabling occurs again on the occurrence of the next enabling signal provided at its output Q2 by counter Z with the leading edge of a pulse of the output clock pulse train S0 occurring simultaneously with this enable signal. As is apparent from FIGS. 3 and 4 the, duration of the disabled condition of flip flop FF is different for the two cases. However, a phase relationship between the test bits read into the transit memory and read out therefrom is achieved which corresponds at least approximately to the phase relationship determined in the initialization phase described in the foregoing.

In the foregoing, the present invention has been described only by way of example of a circuit arrangement including a transit memory. However, the invention does not require the presence of such a transit memory for the transmission of data signals. Rather, it is generally usable in memory arrangements in which test bits can be read in and read out in parallel to the data bits to be transmitted and which are specifically controllable for such read-in and read-out.

What is claimed is:

1. Circuit arrangement for the transmission of data signals, including a memory arrangement (FIFO) wherein signal bits forming the data signals can be read in a read-in time points determined by the occurrence of pulses of a first clock pulse train and from which the data signal bits can be read out at read-out time points determined by the occurrence of pulses of a second clock pulse train, and having a monitoring arrangement which, on the occurrence of a defined deviation of the read-in time points for the individual data signal bits from the read-out time points respectively allocated thereto, provides a control signal for such a change of the read-out, or as the case may be, the read-in time points, that the desired time separation between these time points is again brought about, comprising:

said monitoring arrangement providing a test bit, wherein said test bit, being periodically repetitively provided by the monitoring arrangement, having a predetermined binary value, and, subject to control by said pulses of both clock pulse trains in parallel with the data signal bits is readable into the memory arrangement and, together with these signal bits, is readable out again therefrom, the monitoring arrangement at its initialization enabling reading out of data signal bits and test bits previously read into the memory arrangement with delay such that following thereafter, a phase relationship exists between test bits read into and read out from the memory arrangement corresponding to said time separation between read-in time points and respective read-out time points corresponding thereto for data signal bits into or out of the memory arrangement, the monitoring arrangement causing a time limited disabling of the memory arrangement with regard to the reading out of data signal bits and test bits upon the exceeding of a defined predetermined change in this phase relationship by providing said control signal, such that the desired phase relationship between test bits read in and read out is at least substantially reestablished.

2. Circuit arrangement according to claim 1 wherein the monitoring arrangement includes an enabling arrangement and a comparator arrangement coupled thereto, a counting arrangement receiving pulses of the first clock pulse train appurtenant to the enabling arrangement, which provides periodically repetitively at a first output said test bit and at a second output a counter signal in fixed phase relationship to the test bit, a flip flop coupled to the second output of the counter arrangement which on initialization of the appurtenant monitoring arrangement or as the case may be on said occurrence of a defined change in the phase relationship of test bits to a disabling signal provided by the comparator arrangement assumes a disabled condition causing disabling of the memory arrangement in relation to the reading out of data signal bits and test bits and with the renewed occurrence of said counter signal assumes an enabled condition enabling read out from the memory arrangement and the comparator arrangement, including a logic circuit which as its input signals receives the test bits occurring at the first output of the counter arrangement and at the output of the memory arrangement respectively and an initialization signal causing initialization of the monitoring arrangements and which, at its output at an initialization of the monitoring arrangement or as the case may be on said occurrence of a defined change in the phase relationship of test bits provides a corresponding disable signal.

3. Circuit arrangement according to claim 2 wherein said memory comprises a transit memory (FIFO) including an internal memory control arrangement controlling read-in and read-out processes which receives at data signal inputs the data signal bits and test bits to be transmitted and which provides the test bits to said logic circuit by way of data signal output carrying the test bits and which is coupled to the output of the logic circuit or as the case may be with the output of the flip flop by way of dedicated control inputs belonging to the memory control arrangement.

* * * * *